United States Patent [19]

Orban et al.

[11] 4,026,989

[45] May 31, 1977

[54] PROCESS FOR THE DIGESTION OF GOETHITE-CONTAINING BAUXITES

[75] Inventors: Ferenc Orbán; Mária Orbán; Tihamér Pintér; György Zsigmond; Péter Siklósi; Karoly Solymár; Pal Toth; János Zambo, all of Budapest, Hungary

[73] Assignees: Aluminiumipari Tervezo Vallalat; Femipari Kutato Intezet, both of Budapest, Hungary

[22] Filed: Sept. 29, 1975

[21] Appl. No.: 617,979

Related U.S. Application Data

[63] Continuation-in-part of Ser. No. 379,654, July 16, 1973, abandoned.

[52] U.S. Cl. .................................. 423/121; 423/131
[51] Int. Cl.² .......................................... C01F 7/06
[58] Field of Search .......................... 423/121, 131

[56] References Cited

UNITED STATES PATENTS

| | | | |
|---|---|---|---|
| 2,181,669 | 11/1939 | Scholder | 423/121 |
| 2,519,362 | 8/1950 | Flint et al. | 423/121 |
| 3,737,514 | 6/1973 | King | 423/121 |

*Primary Examiner*—Herbert T. Carter

[57] ABSTRACT

The present invention provides for an improvement in the Bayer Aluminum manufacturing process wherein the digestion of goethite-containing bauxite is effected in higher yields, at lower temperatures and in a single step by carrying out said digestion in a wet caustic solution containing both calcium oxide and sodium chloride.

3 Claims, 1 Drawing Figure

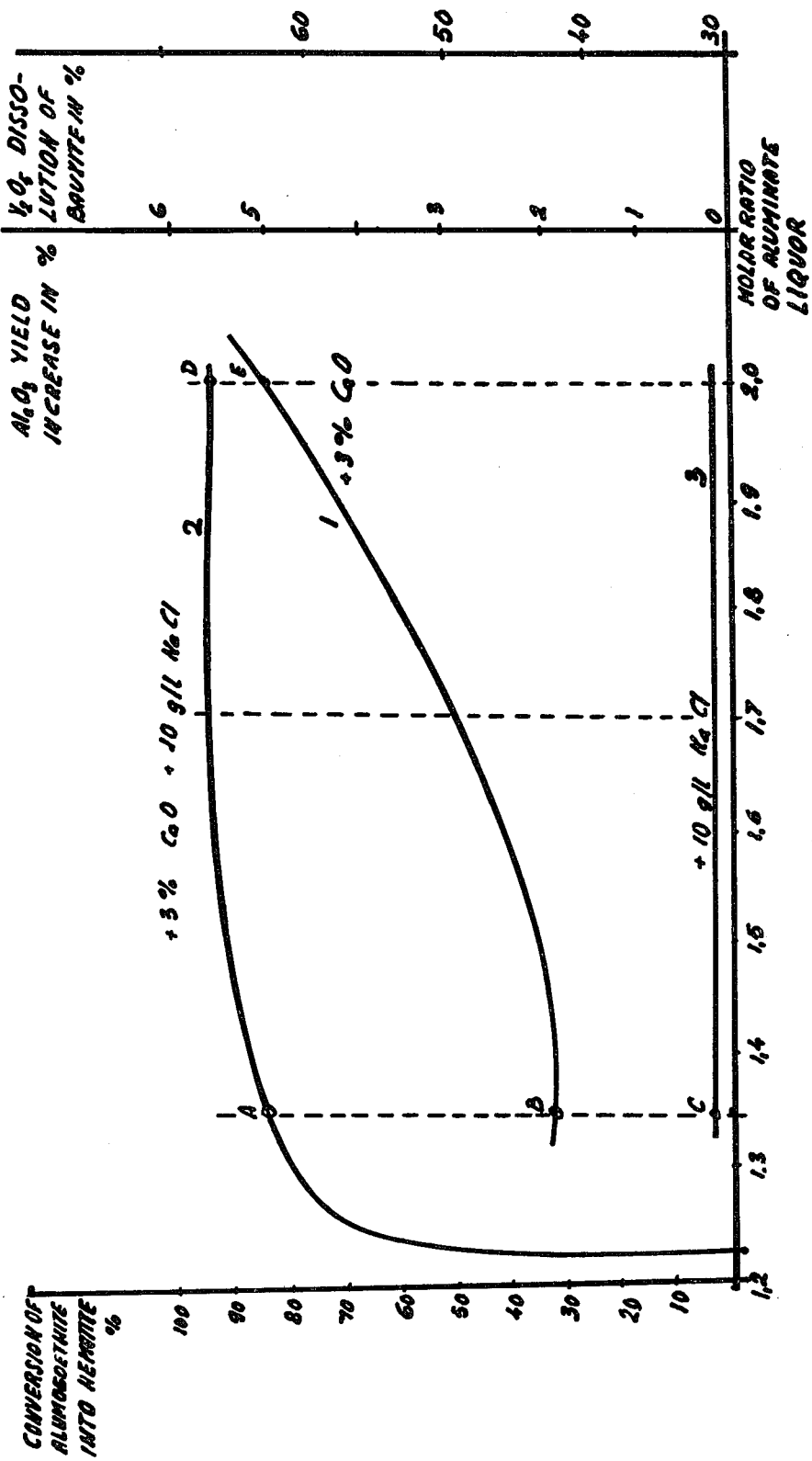

PROCESS FOR THE DIGESTION OF GOETHITE-CONTAINING BAUXITES

CROSS-REFERENCE TO RELATED APPLICATION

This application is a continuation-in-part of Serial No. 379,654, filed July 16, 1973 and now abandoned.

BACKGROUND OF THE INVENTION

More than 90% of the alumina production of the world is prepared by the Bayer process, on applying a digestion temperature of 100°–140° C and 200°–250° C, respectively, depending on the gibbsite or böhmite-diaspore nature of the processed bauxites. The predominant part of the bauxite reserve of the world consists of lateritic bauxites of gibbsite character that contain in general 3 to 20% of böhmite and eventually even 1 to 2% of diaspore whereas the predominant iron mineral is goethite. By isomorphous substitution a maximum of 33 mole % of aluminum may be built-in into the goethite lattice in the place of the Fe atoms. This may cause eventually decreases of up to 5–10% in the yield of alumina. In addition to aluminum, we found that vanadium can be built into the goethite lattice, and in this way this amount of vanadium does not get dissolved into the aluminate liquor under the conditions of the digestion.

In the karstic bauxites of the böhmite-gibbsite type, there is generally an appreciable amount of goethite beside the hematite. On processing the Hungarian, French and Yugoslav bauxites of this type the aluminum containing goethite mineral remains unchanged in the applied temperature range from 200 to 250° C. This causes on one hand an increase in loss of alumina, and on the other hand, owing to the less compact crystal structure of goethite, a reduction in the sedimentability, filterability and washability of the formed red muds. In case of these bauxites also the grade vanadium dissolution is lower too. It is known that the goethite content of the bauxites of Drnis and of Iszkaszentgyörgy can be converted into hematite in a tubular digestion device only at a temperature of 320° to 340° C.

In certain bauxites also lepidocrocite and maghemite occur. The latter contains as a rule a great amount of isomorphe substituted aluminum, and this diminishes similarly to alumogoethite the alumina yield and the separability of the red mud. Its behavior is also similar to that of goethite. Consequently, and reference in the specification and in the claims to goethite is intended also to include lepidocrocite and maghemite. This difficulty could be eliminated for a long time only by the roasting of bauxite.

It is known from recent communications of the literature that at the digestion of goethite-containing bauxite of this type containing isomorphe substituted aluminum the conversion of alumo-goethite into hematite occurs at lower temperatures when CaO is present. The rate and degree of conversion depends also on the period of digestion and on the composition of the aluminate liquor used for digestion. Thus the rate and degree of conversion can be influenced by the variation of these factors. However, the rise of the temperature of digestion, of the alkali concentration and of the molar ratio attained after digestion is restricted partly by availability of apparatus and partly by technological and economical limits. Thus, temperatures over 250° C cannot be maintained in series of autoclaves. The application of tube digesters of higher temperature still present unsolved technical difficulties, and the high-temperature variant of tube digesters still have not become widespread in industrial practice. The rise of the molar ratio after digestion, however, essentially decreases the efficiency of the Bayer cycle.

DESCRIPTION OF THE PREFERRED EMBODIMENTS

Our invention is aimed at converting goethite present in bauxites, in a hydrothermal way, into hematite under the conditions of the Bayer process at a temperature not exceeding 250° C, and as a result of this method attaining substantial improvement in the yield of alumina, in the dissolution of $V_2O_5$ and in the sedimentation, filtration and washability of the red mud.

The process according to our invention is based on the new finding that in the simultaneous presence of CaO and NaCl the conversion of alumogeothite is essentially accelerated in an unexpected way, and thus this conversion can be carried out in the temperature range applied in the present practice, without decreasing the quantity of alumina dissolved in unit volume - i.e. in the vicinity of the equilibral molar ratio - and at a very favorable efficiency. The contents of $Al_2O_3$ and $V_2O_5$ built-in into the goethite lattice are dissolved accordingly, and owing to the conversion of goethite into hematite the separability of the red mud is essentially improved.

Accordingly, our invention provides for an improvement in the Bayer aluminum manufacturing process wherein a goethite-containing bauxite slurry is digested in a wet caustic solution which also contains a calcareous material, the improvement comprising adding about 0.5 to about 12% sodium chloride, based on the dry weight of bauxite, simultaneously with said calcareous material, preferably from about 1 to about 6% calcareous material expressed as CaO based on the dry weight of the bauxite, to the slurry or to one or more ingredients of the slurry, and carrying out said digestion in a single step at a temperature of about 230 to about 260° C, more preferably between about 240° and about 250° C, wherein the molar ratio of aluminate liquor after digestion is in the vicinity of the equilibrium molar ratio. For example, in curve 2 of the drawing the equilibrium molar ratio is 1.22. Optimum results are obtained when the molar ratio of aluminate liquor after digestion is between about 1.3 and about 1.4.

For our purposes, molar ratio is calculated by dividing the weight of $Na_2O$ (caustic) by the weight of $Al_2O_3$ contained in the alkali liquor multiplied by the molecular weight ratio of the two, which is 1.645.

Equilibrium molar ratio is defined as that molar ratio corresponding to the maximum $Al_2O_3$ content dissolvable in a caustic containing a given amount of $Na_2O$. In the case of equilibrium molar ratio the aluminate caustic is saturated in $Al_2O_3$. In the drawing this appears at a molar ratio of 1.22.

The attached drawing illustrates the beneficial results obtained by employing our process with the simultaneous use of CaO and NaCl (curve 2) as compared to the use of CaO alone (curve 1) or NaCl alone (curve 3). The digesting alkali liquor used in these series of experiments contained 240 g/l of $Na_2O$ and 113 g/l of $Al_2O_3$. Digestion was carried out at 245° C for one hour.

The molar ratio of the solution after dissolution is shown on the abscissa.

The differences between the curves 1 and 2 illustrate the advantages of the present invention. As one compares point A of the curve 2 which shows our process, with the additive-free or 10 g/l NaCl-containing curve 3, point C, and with the point B on curve 1 which can be obtained by the addition of 3% CaO, one can observe 5% and 3% respectively additional $Al_2O_3$ yield and a similarly proportional increase in the dissolution of $V_2O_5$. The conversion of goethite to hematite in accordance with our process is about 85%, which is to be compared with the 30% which can be obtained with the process using CaO alone. Accordingly, the separability and washability of the red mud are also proportionately improved. Without the addition of CaO the entire amount of goethite remains unconverted.

The circumstance of how decisive the molar ratio is for the economicality of the process is demonstrated below:

The dissolving caustic originally contained 240 g/l $Na_2O$. This concentration was diluted with the water carried in with the bauxite, to 224 g/l. The $Al_2O_3$ content of the solution having a 1.35 molar ratio corresponding to points A, B, and C, is as follows:

$$Al_2O_3 \text{ g/l} = \frac{Na_2O \text{ g/l} \cdot 1.645}{\text{Molar ratio}} = \frac{224 \cdot 1.645}{1.35} = 273$$

The $Al_2O_3$ content of the dissolving caustic after dilution is:

$$\frac{224 \cdot 113}{240} = 105$$

The $Al_2O_3$ content that has gone into solution at the time of dissolution:

$273 - 105 = 168$ g/l

Curves 1 and 2 approach each other at a molar ratio of 2.00 (points D and E). However, the total $Al_2O_3$ content dissolved in a unit of volume is:

$$Al_2O_3 \text{ g/l} = \frac{244 \cdot 1.645}{2.00} = 184$$

Therefore, the amount of $Al_2O_3$ gone into solution: 184−105=79 g/l The amount of $Al_2O_3$ dissolved in a unit of volume at points D and E, compared to point A, is only:

$$\frac{79 \cdot 100}{168} = 47\%$$

Therefore, twice the volume of caustic is required for the manufacture of the same amount of alumina (in addition to grinding of bauxite and calcining of alumina).

In an intermediate condition, such as in case of a molar ratio of 1.7, the alumina yield according to curve 1 is lower by 2.5% and the amount of alumina which can be obtained from a unit of volume is:

$$\frac{224 \cdot 1.645}{1.7} = 217$$

$217 - 105 = 112$ $\frac{112 \cdot 100}{168} = 67\%$ of the amount obtainable with our process.

The improvement of sedimentation was checked by sedimentation and filtration tests and by the determination of the specific surface of the red muds by the BET method.

It was found that in the vicinity of the equilibral molar ratio (1.25 to 1.30) the filterability and sedimentability of red mud digested in the presence of CaO only was lower by about 30% than those of the red mud obtained in the simultaneous presence of NaCl and CaO. The improvement of sedimentation is unequivocally shown also by the decrease of the specific surface of the red mud which has in the given case 24.3 and 11.7 m³/g., respectively. The improvement of the separability of the red mud is proportional to the degree of conversion from goethite into hematite.

The increase of the dissolution of $V_2O_5$ was checked by the analysis of the $V_2O_5$ content of bauxites and red mud further by the determination of the $V_2O_5$ content of the digesting alkali liquor and the liquor obtained after digestion.

It was found in these investigations that about 40% of the total $V_2O_5$ content of goethite-containing bauxites is bound to goethite, and thus by means of the process according to our invention the usually 20–30% dissolution of $V_2O_5$ can be raised to 60–70%. The quantity of surplus alumina extractable from goethite is in general 2–8%.

On applying our process digestion is performed according to the goethite content of the bauxite and to the binding strength of aluminum atoms bound in goethite in the temperature range from 230° to 260° C, preferably at 240°–250° C, in the simultaneous presence of 1–6% of CaO and 0.5–12.0% of NaCl referred to the dry weight of bauxite. The concentration of the digesting alkali liquor is adjusted fundamentally on the basis of the optimum economy of the given variant of the Bayer process to about 200–250 g/l of $Na_2O$.

When the use of a digestion temperature over 250° C appears to be practical, digestion is carried out in tube digesters.

The process according to our invention is illustrated in details by the example below.

370 kg. of bauxite and 11 kg. (3%) of CaO were fed into 1 m³ of alkali liquor containing 240 g/l $Na_2O_c$ and 10 g/l of NaCl, whose molar ratio was 3.5, and digestion was carried out at 245° C for an hour. The molar ratio after the digestion was 1.34 (point A in curve 2).

The chemical and mineralogical composition of the bauxite and of the red mud formed is shown in the Table below.

Under the given conditions diaspore was completely digested whereas the conversion of alumo-goethite and alumomaghemite into hematite attained 85%. The alumina yield was raised to 89% against 84% attainable by the conventional Bayer process, as a result of the combined digestion of alumogoethite and diaspore. The molar ratio of $Na_2O$ to $SiO_2$ in the red mud was 0.60 against the usual value of 0.75–0.80. The dissolution of $V_2O_5$ from the bauxite increased from 30% to 64%.

Table

| Chemical and mineralogical composition of the bauxite and of the red mud | | |
|---|---|---|
| Component, % | Bauxite | Red mud |
| $Al_2O_3$ in bohmite | 25.0 | 0 |
| in gibbsite | 16.0 | 0 |
| in goethite | 2.1 | 0.6 |
| in kaolinite | 5.0 | 0 |
| in diaspore | 1.3 | 0 |
| in hematite | 0.2 | 0.2 |

Table-continued

Chemical and mineralogical composition of the bauxite and of the red mud

| Component, % | Bauxite | Red mud |
|---|---|---|
| in maghemite | 0.5 | 0 |
| in Na-Al silicate | — | 11.8 |
| total $Al_2O_3$ | 50.1 | 12.6 |
| $Fe_2O_3$ in goethite | 10.2 | 2.7 |
| in hematite | 5.0 | 40.3 |
| in maghemite | 3.5 | 0 |
| total $Fe_2O_3$ | 18.7 | 43.0 |
| $TiO_2$, total | 2.4 | 5.5 |
| $SiO_2$, total | 6.4 | 14.7 |
| $V_2O_5$, soluble in alkali | 0.03 | 0.00 |
| in goethite | 0.04 | 0.015 |
| in other minerals | 0.03 | 0.065 |
| $V_2O_5$ total | 0.01 | 0.08 |
| $Na_2O$ | — | 8.8 |
| CaO | — | 6.9 |
| Loss on ignition | 19.2 | 7.4 |

\* \* \* \* \*

UNITED STATES PATENT OFFICE
CERTIFICATE OF CORRECTION

Patent No. 4,026,989    Dated May 31, 1977

Inventor(s) Ferenc Orban et al.

It is certified that error appears in the above-identified patent and that said Letters Patent are hereby corrected as shown below:

Column 5, after line 14, insert the following:

| | | |
|---|---|---|
| $TiO_2$, total | 2.4 | 5.5 |
| $SiO_2$, total | 6.4 | 14.7 |
| $V_2O_5$, soluble in alkali | 0.03 | 0.00 |
| in goethite | 0.04 | 0.015 |
| in other minerals | 0.03 | 0.065 |
| $V_2O_5$ total | 0.01 | 0.08 |
| $Na_2O$ | - | 8.8 |
| CaO | - | 6.9 |
| Loss on ignition | 19.2 | 7.4 |

UNITED STATES PATENT OFFICE
CERTIFICATE OF CORRECTION

Patent No. 4,026,989　　　　　　　　Dated　　May 31, 1977

Inventor(s)　Ferenc Orban et al.

It is certified that error appears in the above-identified patent and that said Letters Patent are hereby corrected as shown below:

We Claim:

1. In the Bayer aluminum manufacturing process wherein a goethite-containing bauxite slurry is digested in a wet caustic solution which contains from about 1 to about 6% CaO or a derivative thereof convertible to CaO, expressed as CaO based on the dry weight of the bauxite, the improvement which comprises adding from about 0.5 to about 12% sodium chloride, based on the dry weight of bauxite, to the slurry or to one or more ingredients of the slurry, and carrying out said digestion in a single step at a temperature of from about 230°C to about 260°C, and after digestion the molar ratio of aluminate liquor being between about 1.3 and about 1.4.

UNITED STATES PATENT OFFICE
CERTIFICATE OF CORRECTION

Patent No. 4,026,989      Dated May 31, 1977

Inventor(s) Ferenc Orban et al.

It is certified that error appears in the above-identified patent and that said Letters Patent are hereby corrected as shown below:

2. The process of claim 1, wherein the digestion temperature is from about 240°C to about 250°C.

3. The process of claim 1, wherein the concentration of the digesting alkali liquor is between about 200-250 g/l of $Na_2O$.

Column 6, delete lines 1 - 14 inclusive.

Signed and Sealed this

Seventh Day of February 1978

[SEAL]

Attest:

RUTH C. MASON  
Attesting Officer

LUTRELLE F. PARKER  
Acting Commissioner of Patents and Trademarks